(12) United States Patent
Yoshimi

(10) Patent No.: US 12,250,351 B2
(45) Date of Patent: Mar. 11, 2025

(54) INFORMATION PROCESSING DEVICE AND NON-TRANSITORY COMPUTER READABLE MEDIUM FOR CHANGING SETTING ACCORDING TO INSTALLATION PLACE

(71) Applicant: FUJIFILM BUSINESS INNOVATION CORP., Tokyo (JP)

(72) Inventor: Makoto Yoshimi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 653 days.

(21) Appl. No.: 17/150,167

(22) Filed: Jan. 15, 2021

(65) Prior Publication Data
US 2022/0078291 A1    Mar. 10, 2022

(30) Foreign Application Priority Data

Sep. 7, 2020   (JP) .................................. 2020-149948

(51) Int. Cl.
*H04N 1/00*   (2006.01)

(52) U.S. Cl.
CPC ....... *H04N 1/0097* (2013.01); *H04N 1/00482* (2013.01); *H04N 1/00511* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2008/0291485 A1* | 11/2008 | Kimoto | H04N 1/00222 358/1.15 |
| 2009/0128852 A1* | 5/2009 | Fujishita | H04L 41/0856 358/1.15 |
| 2012/0092691 A1* | 4/2012 | Sasakuma | H04N 1/4433 358/1.15 |
| 2012/0096147 A1* | 4/2012 | Sakamoto | H04L 12/6418 709/224 |
| 2013/0148154 A1* | 6/2013 | Ito | G06K 15/02 358/1.15 |
| 2017/0010840 A1* | 1/2017 | Terao | H04N 1/4413 |
| 2017/0255456 A1* | 9/2017 | Igarashi | G06F 8/61 |
| 2019/0208073 A1* | 7/2019 | Ozawa | H04N 1/4433 |
| 2020/0076970 A1* | 3/2020 | Chiba | H04N 1/00389 |
| 2020/0314262 A1* | 10/2020 | Ishikawa | H04L 45/745 |
| 2020/0344372 A1* | 10/2020 | Nakazawa | H04N 1/00856 |
| 2021/0081152 A1* | 3/2021 | Tanaka | G06F 3/1222 |
| 2023/0300265 A1* | 9/2023 | Mizuno | H04N 1/00482 358/1.16 |

FOREIGN PATENT DOCUMENTS

| | | | |
|---|---|---|---|
| JP | 2006164025 A | * | 6/2006 |
| JP | 2007-088890 A | | 4/2007 |
| JP | 6769286 B2 | * | 10/2020 |

* cited by examiner

Primary Examiner — Andrew H Lam
(74) Attorney, Agent, or Firm — Oliff PLC

(57) ABSTRACT

An information processing device includes: a processor configured to: acquire (i) setting information related to a setting of predetermined processing and (ii) information on an installation place; and refer to the information on the installation place where the setting information is used, to change a setting of the setting information to a setting that is based on a changing rule set for each installation place.

10 Claims, 7 Drawing Sheets

INFORMATION PROCESSING DEVICE AND NON-TRANSITORY COMPUTER READABLE MEDIUM FOR CHANGING SETTING ACCORDING TO INSTALLATION PLACE

CROSS-REFERENCE TO RELATED APPLICATIONS

This application is based on and claims priority under 35 USC 119 from Japanese Patent Application No. 2020-149948 filed Sep. 7, 2020.

BACKGROUND

(i) Technical Field

The present disclosure relates to an information processing device and a non-transitory computer readable medium.

(ii) Related Art

JP-A-2006-164025 discloses a multifunction device in which a setting is validated in a device at a timing that is associated with setting contents in advance, to thereby prevent setting information from becoming valid while a user is using the device or the device is performing processing, and a timing at which the setting is validated is changed according to the contents of the setting information to thereby validate the setting at an appropriate timing according to the contents of the setting information.

JP-A-2007-88890 discloses a parameter setting system in which setting information of users can be collectively managed without using a server, and parameters can be easily set for each device even in an environment where plural devices operate.

SUMMARY

Setting information that a user uses on an image forming device installed in a private area such as a company may be used on an image forming device installed in a public area. In such a case, if confidential settings such as settings that are not to be leaked to the outside of the company are not changed, such confidential settings may be leaked from the image forming device.

Aspects of non-limiting embodiments of the present disclosure relate to providing an information processing device and a non-transitory computer readable medium that automatically change setting information that is referenced when processing is executed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including: a processor configured to: acquire (i) setting information related to a setting of predetermined processing and (ii) information on an installation place; and refer to the information on the installation place where the setting information is used, to change a setting of the setting information to a setting that is based on a changing rule set for each installation place.

BRIEF DESCRIPTION OF THE DRAWINGS

Exemplary embodiment(s) of the present disclosure will be described in detail based on the following figures, wherein.

DETAILED DESCRIPTION

Figure 1:
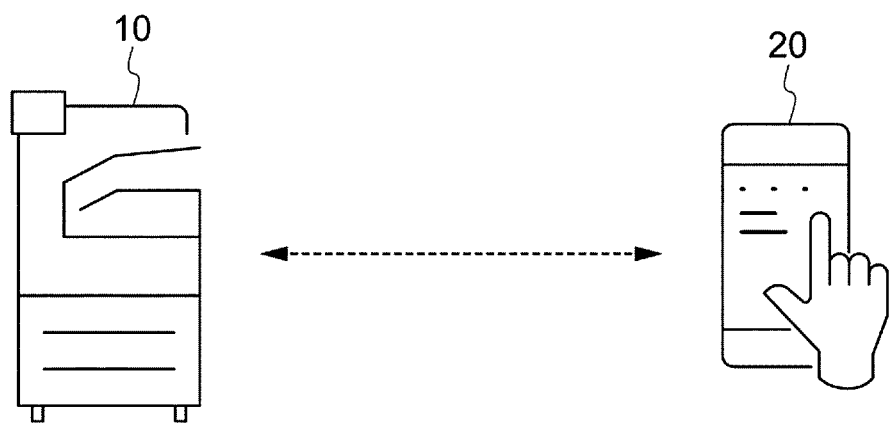
FIG. 1 is a diagram showing a schematic configuration of an information processing system according to a first exemplary embodiment.

Hereinafter, exemplary embodiments of the present disclosure will be described with reference to the accompanying drawings. The same reference numerals are given to the same or equivalent elements and parts in drawing. Dimensional ratios in the drawings may be exaggerated for convenience of description and may differ from the actual ratios.

First Exemplary Embodiment

FIG. 1 is a diagram showing a schematic configuration of an information processing system according to a first exemplary embodiment. As shown in FIG. 1, the information processing system according to the first exemplary embodiment includes an image forming device 10 and a user terminal 20.

The image forming device 10 is an example of an "information processing device" of the present disclosure. The image forming device 10 is a device that forms an image on a recording medium such as a sheet based on a printing job and that optically reads information formed on a recording medium. The image forming device 10 may be a multifunction device capable of executing plural functions including, for example, a print function and a scan function. The image forming device 10 has an e-mail function of attaching the optically read electronic data to an e-mail based on an operation of a user, and transmitting the e-mail.

The image forming device 10 may be installed in various places. The image forming device 10 may be installed not only in a private area such as an office that is used only by limited users, but also in a public area such as a convenience store or a shared office that can be used by unspecified users. In the present exemplary embodiment, it is assumed that the image forming device 10 is installed in a public area such as a convenience store that can be used by unspecified users.

The user terminal 20 is a terminal owned by a user who uses the image forming device 10. The user terminal 20 may be, for example, a smartphone, a tablet terminal, a laptop computer. The user terminal 20 stores one piece or plural pieces of setting information related to an operation of the image forming device 10. When the user uses the image forming device 10, the user terminal 20 transfers setting information selected by the user to the image forming device 10.

The setting information stored in the user terminal 20 is information related to a setting of any one of a copy function, a print function, a scan function, and an e-mail function. For example, the setting information of the e-mail function may include a source mail address, a destination mail address, and the setting of the scan function. The setting information of the scan function may include, for example, a setting of a format of electronic data, a setting of a reading magnification, and a setting as to whether to read both sides of a recording medium. Since the setting information is stored in the user terminal 20, the user may cause the image forming device 10 to execute a desired function using preset contents without inputting a setting to the image forming device 10. Furthermore, since the user carries the user terminal 20, the user may cause any image forming device 10 to execute processing based on the similar setting information.

The setting information stored in the user terminal 20 may include non-confidential information such as a setting of a format of electronic data, a setting of a reading magnification, and a setting as to whether to read both sides of a recording medium. Even if the non-confidential information is directly set to the image forming device 10, no issue arise. However, the setting information stored in the user terminal 20 may include confidential information such as personal information or information for company use only. Examples of a case in which the setting information stored in the user terminal 20 includes the confidential information include (i) a case in which a destination mail address is a mail address of a business partner and (ii) a case in which a source mail address is a mail address of a member of a company. When the setting information including such confidential information is set in the image forming device 10, if the setting remains in the image forming device 10, there is a risk that the confidential information such as the personal information or the information for company use only may be leaked due to the confidential information being seen by another user who uses the image forming device 10 next.

The image forming device 10 according to the present exemplary embodiment automatically changes the setting based on a changing rule that is determined according to an installation place of the image forming device 10. For example, in the image forming device 10 according to the present exemplary embodiment, setting information (for example, the confidential information such as the personal information or the information for company use only) which is not desirable to be set as it is depending on the installation place may be set. When the setting information, which is not desirable to be set as it is, is to be set, the image forming device 10 automatically changes the setting based on the changing rule which is determined according to the installation place. The image forming device 10 automatically changes the setting based on the changing rule which is determined according to the installation place of the image forming device 10, so that a risk of leakage of the confidential information such as the personal information or the information for company use only is reduced as compared with a case in which the setting is not changed.

Figure 2:
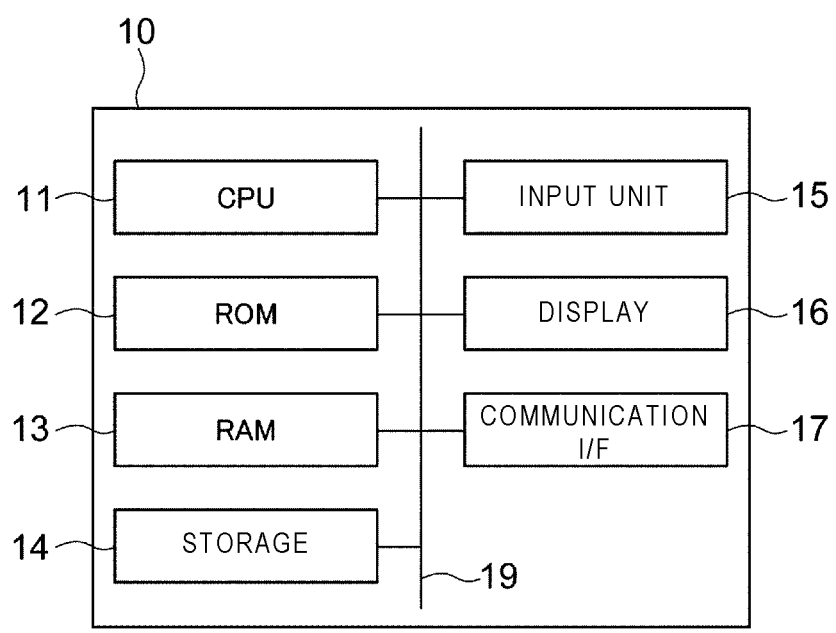
FIG. 2 is a block diagram showing a hardware configuration of an image forming device.

FIG. 2 is a block diagram showing a hardware configuration of the image forming device 10.

As shown in FIG. 2, the image forming device 10 includes a central processing unit (CPU) 11, a read only memory (ROM) 12, a random access memory (RAM) 13, a storage 14, an input unit 15, a display 16, and a communication interface (I/F) 17. These units are communicably connected to each other via a bus 19.

The CPU 11 executes various programs and controls each unit. That is, the CPU 11 reads a program from the ROM 12 or the storage 14, and executes the program using the RAM 13 as a work area. The CPU 11 controls each unit described above and performs various arithmetic processing according to the program recorded in the ROM 12 or the storage 14. In the present exemplary embodiment, the ROM 12 or the storage 14 stores a setting information change program for changing the setting information acquired from the user terminal 20.

The ROM 12 stores various programs and various data. The RAM 13, serving as a work area, temporarily stores a program or data. The storage 14 is implemented by a storage device such as a hard disk drive (HDD), a solid state drive (SSD), or a flash memory. The storage 14 stores various programs including an operating system and various data.

The input unit 15 includes a pointing device such as a mouse, and a keyboard, and is used for performing various input.

The display 16 is, for example, a liquid crystal display, and displays various information. The display 16 may adopt a touch panel and serve as the input unit 15.

The communication interface 17 is an interface for communicating with other devices such as the user terminal 20. The communication interface 17 may conform to a standard such as Ethernet (registered trademark), FDDI, Bluetooth (registered trademark), or Wi-Fi (registered trademark).

In executing the setting information change program, the image forming device 10 implements various functions by using the above hardware resources. A functional configuration implemented by the image forming device 10 will be described.

Figure 3:
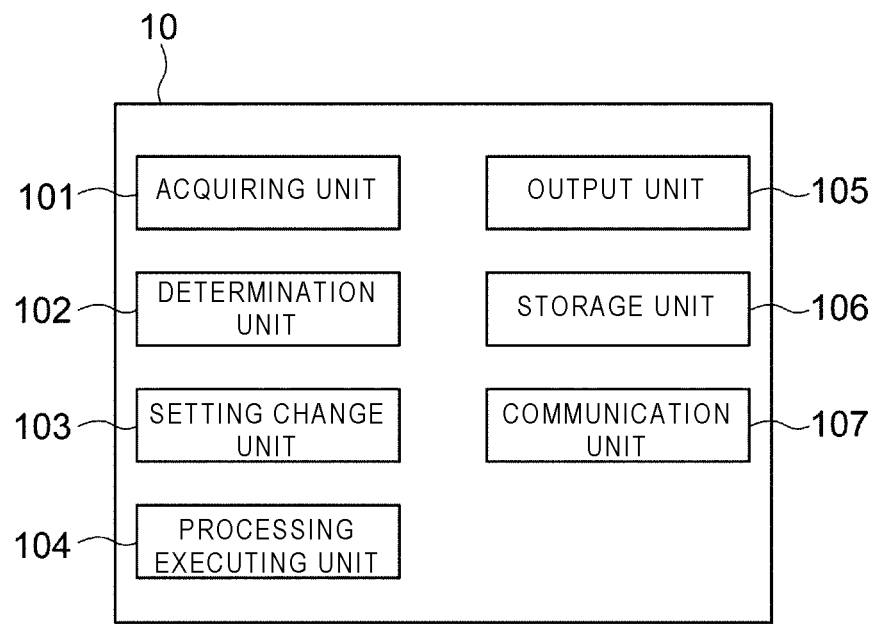
FIG. 3 is a block diagram showing an example of a functional configuration of the image forming device.

FIG. 3 is a block diagram showing an example of the functional configuration of the image forming device 10.

As shown in FIG. 3, the image forming device 10 includes an acquiring unit 101, a determination unit 102, a setting change unit 103, a processing executing unit 104, an output unit 105, a storage unit 106, and a communication unit 107 as functional configurations. Each functional configuration is implemented by the CPU 11 reading and executing the setting information change program stored in the ROM 12 or the storage 14.

The acquiring unit 101 acquires setting information received by the communication unit 107 from another device, for example, the user terminal 20. The setting information acquired by the acquiring unit 101 is setting information that is used when the processing executing unit 104 executes processing.

The determination unit 102 determines whether the setting information acquired by the acquiring unit 101 is setting information which is desirable to be set at an installation place of the own device as it is. When determining whether the setting information acquired by the acquiring unit 101 is desirable to be set at the installation place of the own device as it is, the determination unit 102 refers to (i) contents of each setting of the setting information and (ii) information related to the installation place of the image forming device 10. The information related to the installation place of the image forming device 10 is stored in the storage unit 106. The information related to the installation place of the image forming device 10 may be (i) information on a specific installation place such as an "office", a "convenience store", or a "shared office" or (ii) a security level that is set according to the installation place. The security level may be set, for example, on a three-grade scale, that is, a scale of 1 to 3. When the image forming device 10 is installed in a more private area, the security level may increase.

For example, it is assumed that the setting information includes a source mail address and a destination mail address of an e-mail. It is also assumed that the installation place of the image forming device 10 stored in the storage unit 106 is a "convenience store". The determination unit 102 determines that it is not desirable to set the addresses of the e-mail as it is in the image forming device 10, which is installed in the convenience store, without changing the addresses of the e-mail. The contents of the setting which is determined by the determination unit 102 that it is not desirable to set the setting at the current installation place as it is are changed by the setting change unit 103 (which will be described later) based on the changing rule which is determined according to the current installation place.

The determination unit 102 may use information on a place where the setting information is created in determining whether the setting information acquired by the acquiring unit 101 is setting information which is desirable to be set at an installation place of the own device as it is. For example, when the setting information is created on a company PC, the setting information is likely to include confidential information. Therefore, when the installation place of the image forming device 10 is a "convenience store" and the setting information acquired by the acquiring unit 101 is created on a company PC, the determination unit 102 may determine that it is not desirable to set the addresses of the e-mail at the installation place of the own device as they are.

The information related to the installation place of the image forming device 10 may be set by an installation operator at a time when the image forming device 10 is installed. When the installation place of the image forming device 10 is changed, the information related to the installation place of the image forming device 10 may be set by the installation operator at the changed installation place.

The setting change unit 103 changes the contents of the setting information. The contents of the setting information may be changed by a user, or may be changed based on a determination result of the determination unit 102. When the contents of the setting information are changed based on the determination result of the determination unit 102, the setting change unit 103 changes, based on a changing rule that is determined according to the current installation place in advance, the contents of the setting determined by the determination unit 102 that it is not desirable to set the setting at the current installation place as it is. The changing rule which is determined according to the installation place in advance is stored in, for example, the storage unit 106.

Consider the above described case in which the setting information includes the source mail address and the destination mail address of the e-mail which are registered as confidential information and the installation place of the image forming device 10 is the "convenience store". In this case, if the mail addresses are set as they are, the mail addresses may be seen by another user who uses the image forming device 10 thereafter, or the mail addresses registered as confidential information may be leaked to a third party when the image forming device 10 is hacked.

Therefore, the setting change unit 103 changes, based on the changing rule which is determined according to the installation place in advance, the setting that is not desirable to be set at the current installation place as it is. The image forming device 10 prevents leakage of confidential settings by the setting change unit 103 changing, based on the changing rule, the setting which is not desirable to be set as it is.

The changing rule referred to by the setting change unit 103 is determined according to the installation place, and may be stored in the image forming device 10 by the installation operator at the timing when the image forming device 10 is installed. An example of the changing rule is shown below. If the installation place is a convenience store, the changing rule may be a rule that confidential information is changed to non-confidential information. For example, consider the case in which the setting information includes the source mail address and the destination mail address of the e-mail which are registered as confidential information and the installation place of the image forming device 10 is the "convenience store". The setting change unit 103 refers to the changing rule which is determined for the convenience store, and changes the source mail address and the destination mail address to mail addresses that are not confidential information.

When the setting is changed, the setting change unit 103 acquires information related to a setting after being changed from the user terminal 20. For example, when the destination mail address is changed, the setting information acquired by the acquiring unit 101 in advance may include a mail address that is a candidate for the setting after being change, or the user may be requested to input a mail address after being changed at a time of changing.

When there are plural candidates to which the current contents of the setting are changed based on the changing rule, the setting change unit 103 may present the available candidates and request the user to select any of the candidates. For example, consider a case in which the destination mail address in the setting information acquired by the acquiring unit 101 is an address of the business partner and the determination unit 102 determines that it is necessary to change the address of the business partner to another address. When it is possible to change the address of the business partner to either a personal address of the user or a company address, the setting change unit 103 may present the personal address and the company address, and request the user to select which of the personal address and the company address the destination mail address is changed to. A user interface that enables the user to select may be output on the display 16 by the output unit 105 (which will be described later). When there are plural candidates to which the current contents of the setting are changed based on the changing rule, the setting change unit 103 may change the setting based on a past change history. When there are plural changing rules, the setting change unit 103 may refer to the past change history to select one of the changing rules.

The processing executing unit 104 executes processing for which the user specifies execution. In the present exemplary embodiment, the processing executed by the processing executing unit 104 includes a copy function, a print function, a scan function, and an e-mail function of attaching electronic data optically read by the scan function to an e-mail and transmitting the e-mail. During executing of each of the above functions, the processing executing unit 104 executes the function based on the setting information acquired by the acquiring unit 101. If the setting information acquired by the acquiring unit 101 is changed by the setting change unit 103, the processing executing unit 104 executes each function based on the setting information changed by the setting change unit 103.

The output unit 105 outputs various information on the display 16. The information output by the output unit 105 on the display 16 is, for example, contents of the setting information acquired by the acquiring unit 101 from another device.

The storage unit 106 stores various information related to the operation of the image forming device 10. The storage unit 106 stores, for example, information related to the installation place of the image forming device 10 described above, and the changing rule which is used by the setting change unit 103 and is determined according to the current installation place in advance.

The communication unit 107 communicates information with another device, for example, the user terminal 20. The image forming device 10 receives the setting information from the user terminal 20 via the communication performed by the communication unit 107.

Since the image forming device 10 includes the functional configurations shown in FIG. 3, the setting is automatically changed based on the changing rule which is determined according to the installation place in advance. For example, the image forming device 10 automatically changes, based on the changing rule which is determined according to the installation place in advance, the setting information (such as confidential information) which is not desirable to be set at an installation place (such as a convenience store) used by unspecified users.

Next, the operation of the image forming device 10 will be described.

Figure 4:
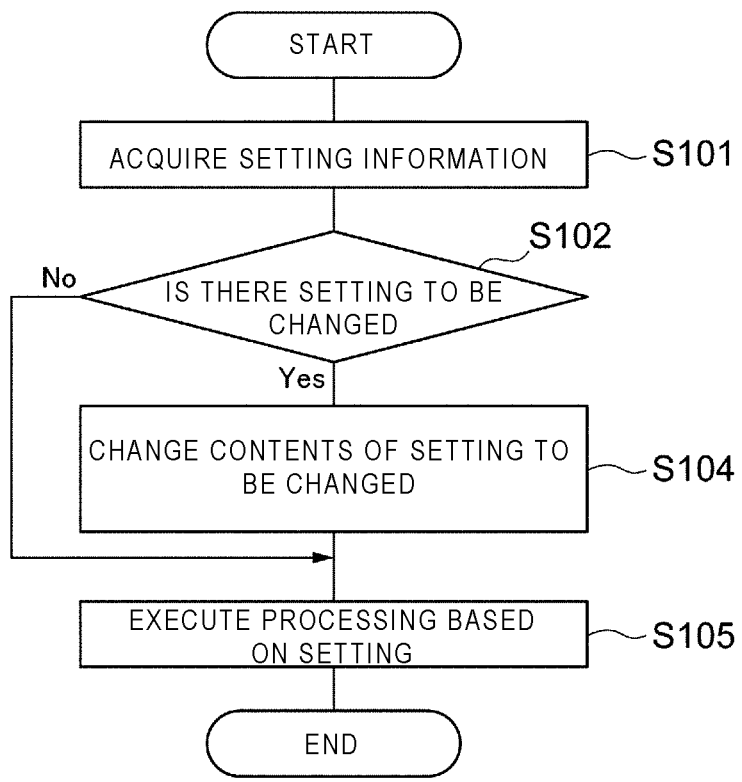
FIG. 4 is a flowchart of setting information changing processing performed by the image forming device.

FIG. 4 is a flowchart of setting information changing processing by the image forming device 10. The setting information changing processing is performed by the CPU 11 reading the setting information change program from the ROM 12 or the storage 14, loading the setting information change program on the RAM 13, and executing the setting information changing program.

Figure 5:
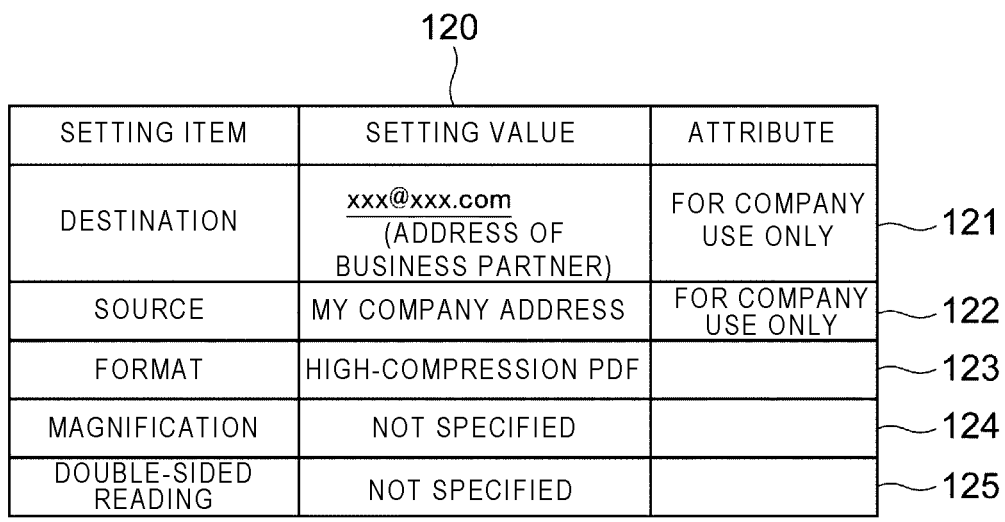
FIG. 5 is a diagram showing an example of the setting information acquired by a CPU of the image forming device.

First, the CPU 11 acquires setting information from another device, for example, the user terminal 20 (step S101). FIG. 5 is a diagram showing an example of the setting information acquired by the CPU 11 in step S101. Setting information 120 shown in FIG. 5 includes a destination mail address 121, a source mail address 122, a reading format setting 123, a magnification setting 124, and a double-sided reading setting 125. In the reading format setting 123, a format of electronic data that is generated by executing the scan function is set. In the magnification setting 124, a reading magnification in executing the scan function is set. In the double-sided reading setting 125, whether to read both sides of a recording medium in executing the scan function is set.

Attribute information is set in each setting of the setting information 120. In each attribute information, for example, whether an associated setting is information for company use only is set. In the example of FIG. 5, the destination mail address 121 and the source mail address 122 are set to be information for company use only.

Following step S101, the CPU 11 determines whether the setting information acquired in step S101 includes a setting that is to be changed (step S102). In making the determination in step S102, the CPU 11 refers to (i) the contents of each setting of the acquired setting information and (ii) the information related to the installation place of the image forming device 10.

The setting information 120 shown in FIG. 5 will be described as an example. When the image forming device 10 is installed in a convenience store, the CPU 11 determines whether the setting information 120 includes a setting that is not desirable to be set in the image forming device 10 installed in the convenience store and is to be changed. In the example shown in FIG. 5, the destination mail address 121 and the source mail address 122 are set to be the information for company use only. Therefore, the CPU 11 determines that the destination mail address 121 and the source mail address 122 are to be changed.

A security level may be set for an attribute of each setting of the setting information. When the security level is set in the attribute information, the CPU 11 compares the security level with a security level set in the image forming device 10, to determine whether the setting information acquired in step S101 includes a setting that is to be changed. For example, it is assumed that a security level of the destination mail address 121 is 3. In this case, when the security level set in the image forming device 10 is less than 3, the CPU 11 determines that the destination mail address 121 is to be changed.

As a result of the determination in step S102, when determining that the setting information acquired in step S101 includes a setting that is to be changed (Yes at step S102), the CPU 11 changes the setting that is to be changed based on the changing rule which is determined according to the installation place (step S104). In changing the setting that is to be changed based on the changing rule which is determined according to the installation place, the CPU 11 may change the setting to contents that are attached to the setting information acquired in step S101 and that are a candidate for the setting after being changed, or may request a user to input contents after being changed at the time of the changing.

Figure 6:
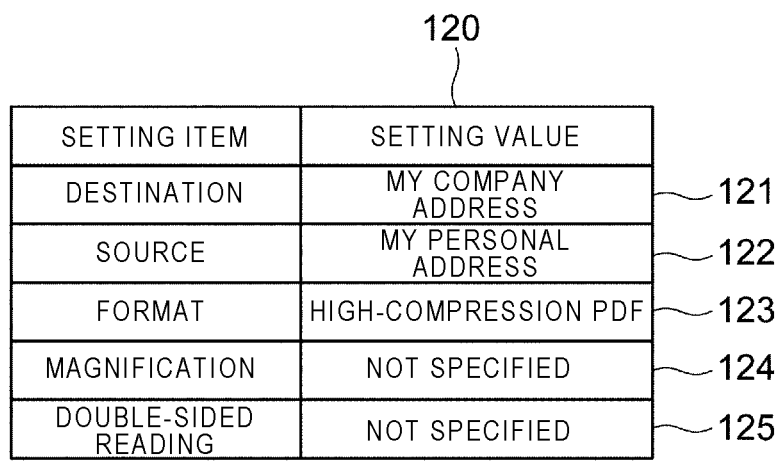
FIG. 6 is a diagram showing an example of the setting information whose contents are changed by the CPU of the image forming device.

The setting information 120 shown in FIG. 5 will be described as an example. When determining that the destination mail address 121 and the source mail address 122 are to be changed, the CPU 11 changes the contents of the destination mail address 121 and the source mail address 122. FIG. 6 is a diagram showing an example of the setting information 120 whose contents are changed by the CPU 11. In the example shown in FIG. 6, the contents of the destination mail address 121 and the source mail address 122 are changed from those shown in FIG. 5. The CPU 11 changes the destination mail address 121 from the mail address of the business partner to a company address of the user, and changes the source mail address 122 from the company address of the user to a personal address of the user. It is noted that in FIG. 6, the attribute information is omitted.

Following step S104, the CPU 11 executes the specified processing using the setting information whose contents are changed in step S104 (step S105). As a result of the determination in step S102, when determining that the setting information acquired in step S101 includes no setting that is to be changed (No at step S102), the CPU 11 similarly executes the specified processing using the setting information acquired in step S101 (step S105).

By executing the series of processing shown in FIG. 4, the image forming device 10 changes the setting based on the changing rule which is determined according to the installation place in advance. The image forming device 10 automatically changes the setting information (such as confidential information) which is not desirable to be set at the current installation place based on the changing rule which is determined according to the installation place in advance.

Second Exemplary Embodiment

Figure 7:
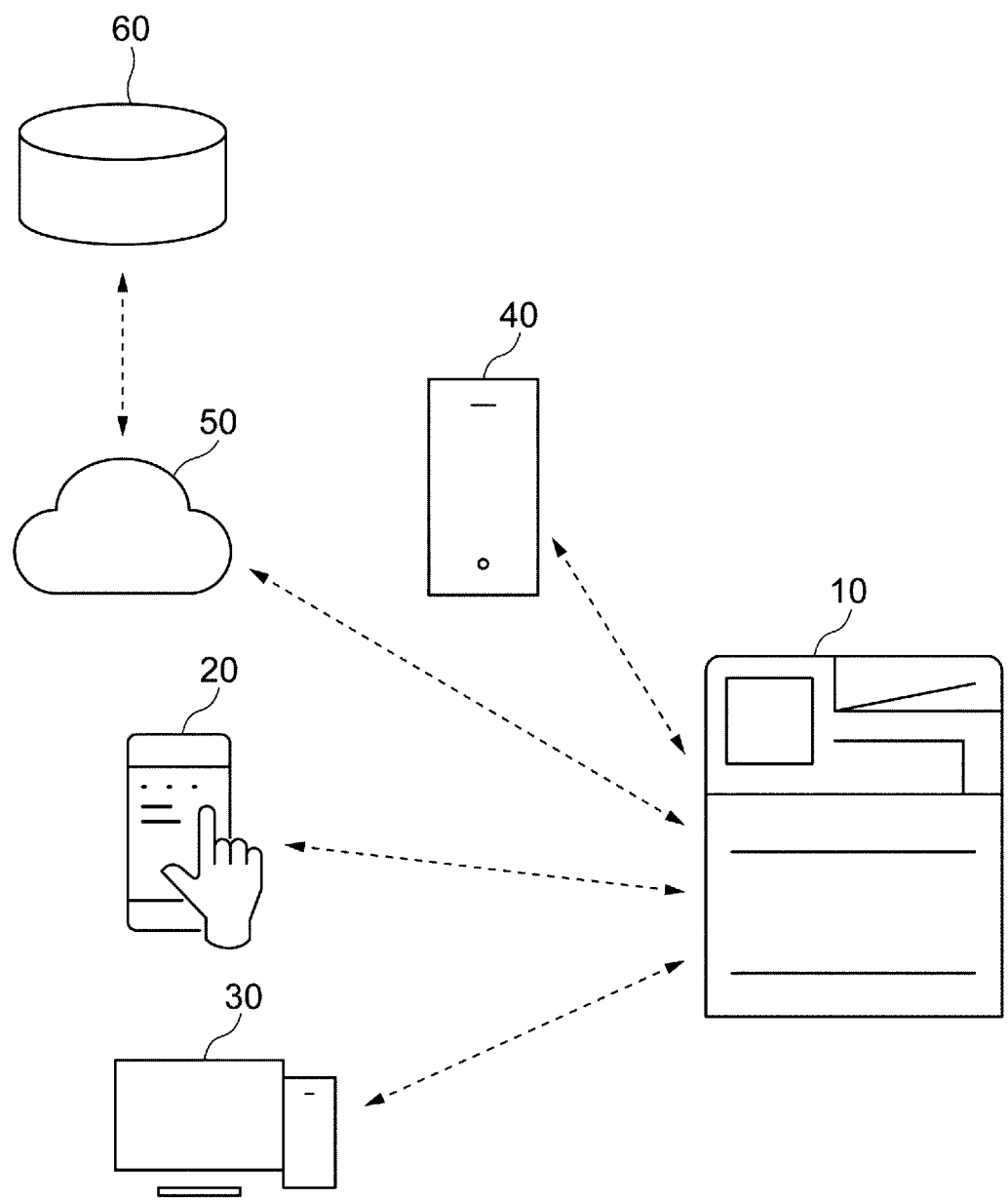
FIG. 7 is a diagram showing a schematic configuration of an information processing system according to a second exemplary embodiment.

FIG. 7 is a diagram showing a schematic configuration of an information processing system according to a second exemplary embodiment. As shown in FIG. 7, the information processing system according to the second exemplary embodiment includes the image forming device 10, user terminals 20 and 30, an in-house server 40, a cloud server 50, and a setting server 60. The in-house server 40 is a server installed in a private area such as a company where a user works. The cloud server 50 is a server installed in a cloud environment that is different from the company where the user works. The image forming device 10 shown in FIG. 7 is installed in a private area such as a company that only by limited users are permitted to use. The setting server 60 is a server that stores setting information of the image forming device 10. The setting server 60 may be a part of the cloud server 50. The image forming device 10 shown in FIG. 7 acquires setting information from the user terminals 20 and 30, the in-house server 40, and the cloud server 50, and presents the acquired setting information to a user.

The image forming device 10 identifies a user who uses the image forming device 10 based on information that the user inputs. Examples of the manner in which the user inputs the information include (i) the user directly inputting a user ID, and (ii) a user ID being input by proximity contactless communication using the user terminal 20 that the user uses or an IC card.

When specifying the user who uses the image forming device 10, the image forming device 10 acquires the setting information from the user terminals 20 and 30, the in-house server 40, and the cloud server 50 by the acquiring unit 101. Then, the image forming device 10 outputs a list of the acquired setting information to the display 16 by the output unit 105.

The image forming device 10 shown in FIG. 7 may also store a changing rule as in the first exemplary embodiment. In the second exemplary embodiment, the image forming device 10 is installed in the private area. Thus, a risk of leakage of confidential information in the second exemplary embodiment is lower than that in the first exemplary embodiment. However, even in the present exemplary embodiment, the image forming device 10 stores the changing rule which is appropriately set, so that the risk of leakage of the confidential information is reduced compared to a case where the image forming device 10 does not store the changing rule.

Figure 8:
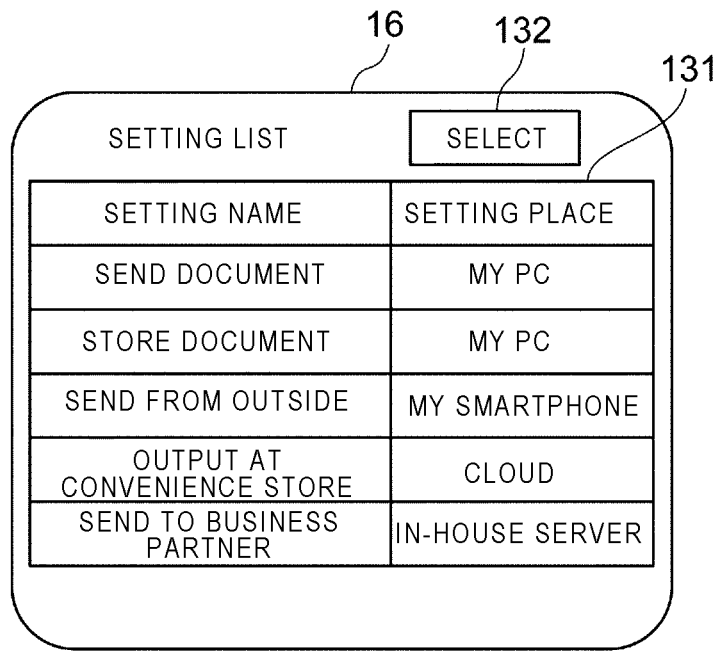
FIG. 8 is a diagram showing an example of a list of setting information output on a display of an image forming device.

FIG. 8 is a diagram showing an example of the list of the setting information output on the display 16 of the image forming device 10. A list 131 is a list of the setting information acquired from the user terminals 20 and 30, the in-house server 40, and the cloud server 50. The list 131 includes an acquiring source of the setting information and a title for identifying the setting information. A selection button 132 is a button for reflecting setting information that is selected by the user from the list 131, in the image forming device 10.

Figure 9:
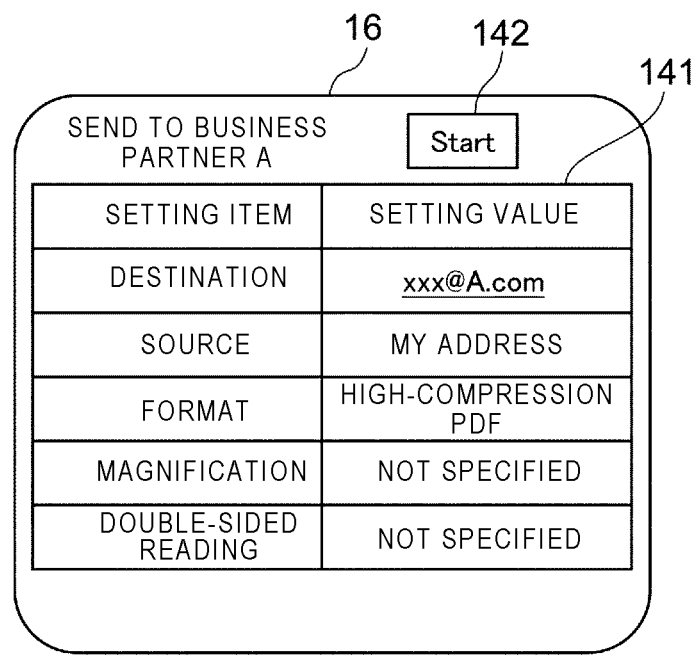
FIG. 9 is a diagram showing an example of details of the setting information output on the display of the image forming device.

FIG. 9 is a diagram showing an example of details of the setting information that are output on the display 16 of the image forming device 10. FIG. 9 shows detailed contents 141 of the setting information that are output on the display 16 when "send to business partner A" is selected in the list 131 of FIG. 8. When the user confirms the contents of the setting information by looking at the detailed contents 141 and selects a start button 142, the image forming device 10 executes, based on the setting information set in the detailed contents 141, processing of transmitting an e-mail to which electronic data generated by the scan function is attached to the business partner A.

According to the second exemplary embodiment, when the image forming device 10 is installed in a place (such as a company) that is used only by limited people, setting information is acquired from various places, and the user is allowed to select the acquired setting information.

Third Exemplary Embodiment

Figure 10:
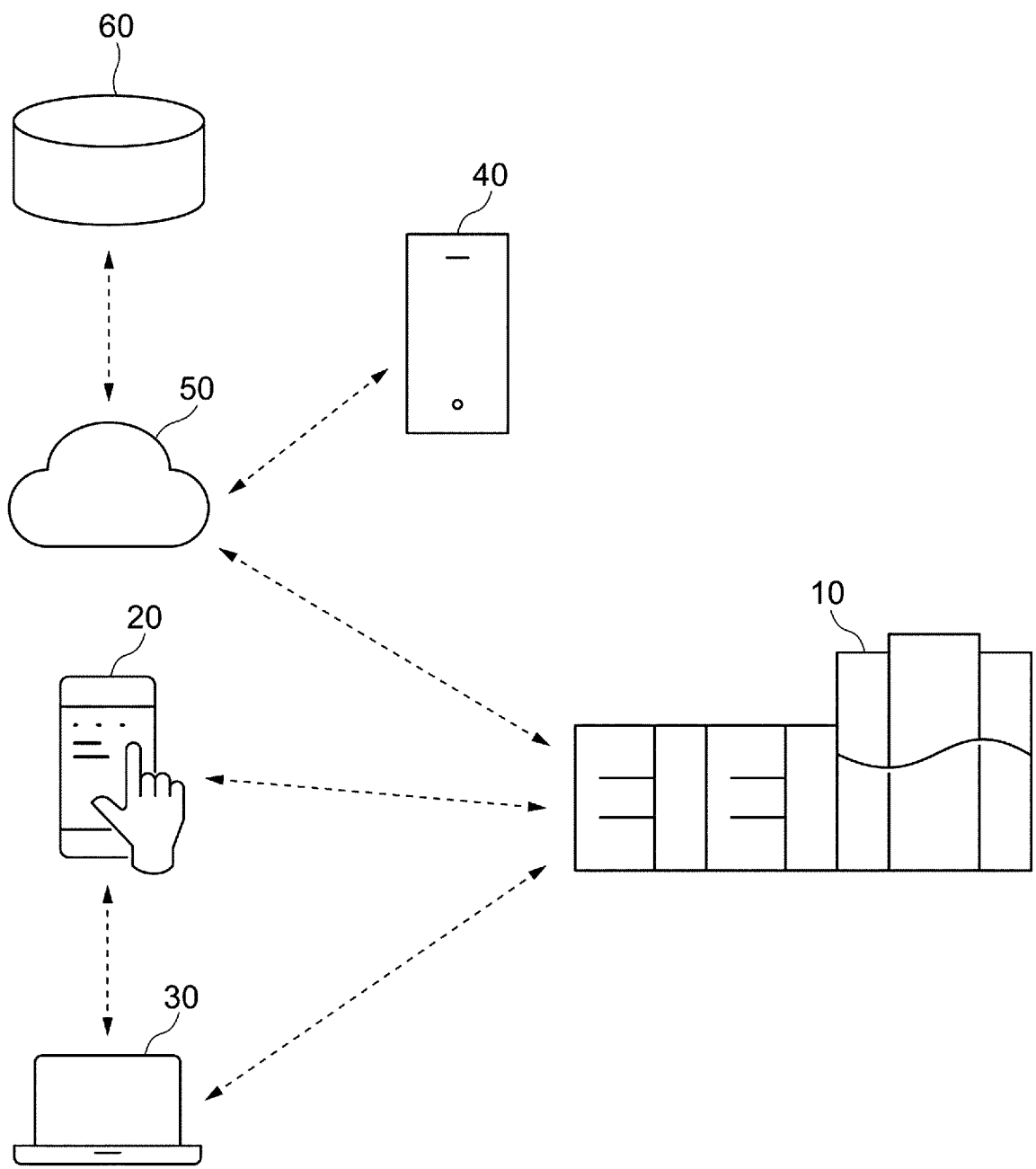
FIG. 10 is a diagram showing a schematic configuration of an information processing system according to a third exemplary embodiment.

FIG. 10 is a diagram showing a schematic configuration of an information processing system according to a third exemplary embodiment. As shown in FIG. 10, the information processing system according to the third exemplary embodiment includes the image forming device 10, the user terminals 20 and 30, the in-house server 40, the cloud server 50, and the setting server 60. The setting server 60 is a server that stores setting information of the image forming device 10. The setting server 60 may be a part of the cloud server 50. The image forming device 10 shown in FIG. 10 is installed in a place such as a shared office that can be used by users who apply for the use of the place and are permitted to use the place. The image forming device 10 installed in the shared office or the like does not always store setting information, but stores the setting information only at a timing when a user uses the setting information. In the third exemplary embodiment, the in-house server 40 is a server that is accessible from the outside.

The image forming device 10 shown in FIG. 10 acquires setting information from the in-house server 40, the cloud server 50, and the setting server 60. The image forming device 10 is able to transfer the setting information acquired from each server to the user terminals 20 and 30. The image forming device 10 according to the present exemplary embodiment is able to acquire setting information from the user terminals 20 and 30.

When communication between the user terminals 20 and 30 is established, the user terminal 20 may acquire the setting information stored in the user terminal 30 and allow the user to use the acquired setting information. Similarly, when the communication between the user terminals 20 and 30 is established, the user terminal 30 may acquire the setting information stored in the user terminal 20 and allow the user to use the acquired setting information. In other words, when communication between the user terminals 20 and 30 is not established, the user terminal 30 cannot transmit the setting information to the user terminal 20, and the user terminal 20 cannot transmit the setting information to the user terminal 30.

The user terminals 20 and 30 present the setting information acquired by the image forming device 10 and transferred from the image forming device 10, to allow the user to select setting information. Then, the user terminals 20 and 30 transmit the setting information selected by the user to the image forming device 10. The image forming device 10 executes processing based on the setting information selected on the user terminals 20 and 30.

The image forming device 10 shown in FIG. 10 may also store a changing rule as in the first exemplary embodiment. In the third exemplary embodiment, the image forming device 10 is installed in an area used by unspecified users. Therefore, a risk of leakage of confidential information in the third exemplary embodiment is lower than that in the first exemplary embodiment, but higher than that in the second exemplary embodiment. Even in the present exemplary embodiment, the image forming device 10 stores the changing rule which is appropriately set, so that the risk of leakage of the confidential information is reduced compared to a case where the image forming device 10 does not store the changing rule.

Figure 11:
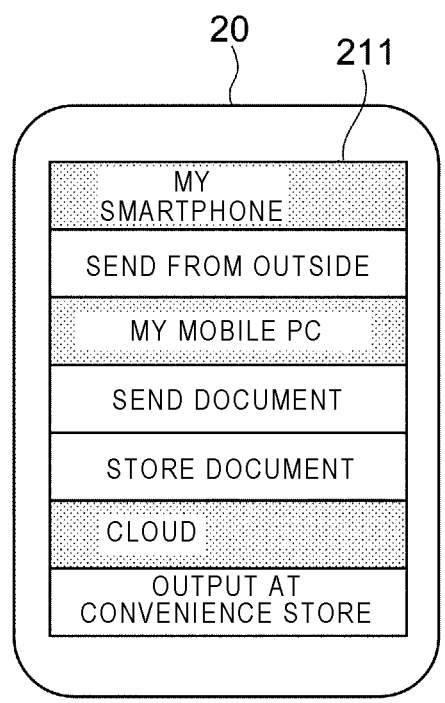
FIG. 11 is a diagram showing an example of a list of setting information displayed on a user terminal.

FIG. 11 is a diagram showing an example of a list of the setting information displayed on the user terminal 20. FIG. 11 shows a list 211 of the setting information acquired by the image forming device 10 and transferred from the image forming device 10. In the list 211, the setting information is summarized for each acquired place, such that a user understands where the setting information is acquired from. The list 211 shown in FIG. 11 is a list of setting information acquired by the image forming device 10 from the user terminal 20 which is a smartphone, the user terminal 30 which is a mobile PC, and the cloud server 50. The user is allowed to select one piece of setting information from the list 211 and cause the image forming device 10 to execute processing.

When the setting information selected in the user terminals 20 and 30 is transmitted to the image forming device 10, the image forming device 10 may automatically change contents of the setting information as described in the first exemplary embodiment. Alternatively, when the setting information selected in the user terminals 20 and 30 is transmitted to the image forming device 10, the user may operate the image forming device 10 to change the content of the setting information. The setting information whose contents are changed by the setting change unit 103 may be stored, according to an operation of the user, in a place that can be accessed from the image forming device 10. For example, the setting information whose contents are changed may be stored in the setting server 60. Also, for example, the setting information whose contents are changed may be stored in a place where original setting information is stored. It is assumed that the place where the original setting information is stored is the user terminals 20 and 30. In this case, only when communication between the image forming device 10 and the user terminals 20 and 30 is established, or only after the communication between the image forming device 10 and the user terminals 20 and 30 is reestablished, the setting information after being changed may be stored in the user terminals 20 and 30.

When the contents are changed in the image forming device 10, but the user wants to select to store the setting information after being changed, the setting change unit 103 does not store the setting information whose contents are changed, and discards the setting information at a predetermined timing. For example, when detecting that a usage period during which the user is allowed to use a shared office has elapsed, the image forming device 10 may discard the acquired setting information.

According to the third exemplary embodiment, when the image forming device 10 is installed in a place (such as the shared office) which can be used by the users who applies for the use of the place and are permitted to use the place, setting information is acquired from various places, and the user is allowed to select the acquired setting information.

In the above exemplary embodiment, the setting information changing processing is executed by the image forming device 10. It is noted that the present disclosure is not limited to this example. For example, the user terminal 20 may execute the setting information changing processing. When the user terminal 20 executes the setting information changing processing, the user terminal 20 acquires information related to the installation place of the image forming device 10 from the image forming device 10, and compares the acquired information with the setting information stored in the user terminal 20. Then, the user terminal 20 determines whether it is desirable to set each setting of the setting information in the image forming device 10. If it is not desirable to set some of the settings in the image forming device 10 as it is, the user terminal 20 automatically changes the contents of the setting in interest based on the changing rule which is determined according to the installation place of the image forming device 10. Then, the user terminal 20 transfers, to the image forming device 10, the setting whose contents are changed based on the changing rule.

Various processors other than the CPU may execute the setting information changing processing, which is executed by the CPU reading the software (program) in the above exemplary embodiments. In this case, examples of the processor include (i) a programmable logic device (PLD) (such as a field-programmable gate array (FPGA)) whose circuit configuration may be changed after being manufactured, and (ii) a dedicated electric circuit (such as an application specific integrated circuit (ASIC)) that is a processor having a circuit configuration specially designed to execute specific processing. The setting information changing processing may be executed by one of these various processors, or may be executed by a combination of two or more processors of the same type or different types (for example, a combination of plural FPGAs or a combination of a CPU and an FPGA). The hardware structures of these various processors are, more specifically, electric circuits in which circuit elements such as semiconductor elements are combined.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In each of the above exemplary embodiments, a program for the setting information changing processing is stored (installed) in a ROM or a storage in advance. It is noted that the present disclosure is not limited to this example. The program may be provided in such a form that the program is recorded in a non-transitory recording medium such as a compact disk read only memory (CD-ROM), a digital versatile disk online memory (DVD-ROM), and a universal serial bus (USB) memory. Alternatively, the program may be downloaded from an external device via a network.

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
a processor configured to:
acquire (i) setting information related to setting predetermined processing and (ii) information on a physical installation place in real space;
determine whether a setting of the setting information should be changed based on (i) a content of each setting of the setting information and (ii) the information on the physical installation place;
in response to determining that the setting should be changed, refer to the information on the installation place where the setting information is used, to change the setting based on a changing rule set for each installation place;
refer to first attribute information that is set according to an attribute of the installation place as the information on the installation place;
perform a comparison of the first attribute information with second attribute information that is set according to an attribute of each setting of the setting information,
determine whether each setting of the setting information should be changed based also on the comparison between the first attribute information and the second attribute information, and
for each setting, in response to determining that a respective setting should be changed, change the respective setting to the setting which is based on the changing rule set for each installation place.

2. The information processing device according to claim 1, wherein the processor is configured to, in response to determining that the setting should be changed, if there are a plurality of the changing rules, present a plurality of candidate settings that are based on the plurality of changing rules.

3. The information processing device according to claim 2, wherein the processor is configured to select one of the changing rules from the plurality of changing rules based on a change history of the setting.

4. The information processing device according to claim 1, wherein the processor is configured to acquire the setting information from one or more places and present the acquired setting information.

5. The information processing device according to claim 4, wherein the processor is configured to transfer the acquired setting information to another device.

6. The information processing device according to claim 1, wherein the processor is configured to store the setting information after being changed in response to a storage instruction from a user.

7. The information processing device according to claim 1, wherein the processor is configured to execute the predetermined processing based on the setting information after being changed.

8. The information processing device according to claim 7, wherein the processor is configured to execute, as the predetermined processing, processing of transmitting optically read data via an e-mail.

9. A non-transitory computer readable medium storing a program that causes a computer to execute information processing, the information processing comprising:
acquiring (i) setting information related to setting predetermined processing and (ii) information on a physical installation place in real space;
determining whether a setting of the setting information should be changed based on (i) a content of each setting of the setting information and (ii) the information on the physical installation place;
in response to determining that the setting should be changed, referring to the information on the installation place where the setting information is used, to change the setting based on a changing rule set for each installation place
referring to first attribute information that is set according to an attribute of the installation place as the information on the installation place;
performing a comparison of the first attribute information with second attribute information that is set according to an attribute of each setting of the setting information,
determining whether each setting of the setting information should be changed based also on the comparison between the first attribute information and the second attribute information, and
for each setting, in response to determining that a respective setting should be changed, changing the respective setting to the setting which is based on the changing rule set for each installation place.

10. An information processing device comprising:
acquiring means for acquiring (i) setting information related to setting predetermined processing and (ii) information on a physical installation place in real space;
determining means for determining whether a setting of the setting information should be changed based on (i) a content of each setting of the setting information and (ii) the information on the physical installation place; and
referring means for, in response to determining that the setting should be changed, referring to the information on the installation place where the setting information is used, to change the setting based on a changing rule set for each installation place, wherein the information processing device is further configured to:
refer to first attribute information that is set according to an attribute of the installation place as the information on the installation place;
perform a comparison of the first attribute information with second attribute information that is set according to an attribute of each setting of the setting information,
determine whether each setting of the setting information should be changed based also on the comparison between the first attribute information and the second attribute information, and
for each setting, in response to determining that a respective setting should be changed, change the respective setting to the setting which is based on the changing rule set for each installation place.

* * * * *